May 26, 1970     W. K. BANKS     3,514,182

LIGHT FOCUS SHIFTING SYSTEM

Filed Nov. 6, 1967

INVENTOR.
WILLARD K. BANKS

BY *Gerald L. Moore*

Attorney 3,514,182
LIGHT FOCUS SHIFTING SYSTEM
Willard K. Banks, San Jose, Calif., assignor to International Business Machines Corporation, Armonk, N.Y., a corporation of New York
Filed Nov. 6, 1967, Ser. No. 680,804
Int. Cl. G02f 1/28
U.S. Cl. 350—160                                   3 Claims

ABSTRACT OF THE DISCLOSURE

A light focus shifting system is provided wherein a light beam focus can be shifted in response to electrical signals, thereby to enable the quick and precise focusing of the beam to preselected locations.

CROSS-REFERENCE TO RELATED APPLICATION

This invention relates to the light deflector described in U.S. patent application 680,805, filed Nov. 6, 1967, entitled, "Light Deflector System," with M. Rabedeau as the inventor and the same assignee as the present case.

BACKGROUND OF THE INVENTION

Field of the invention

This invention relates to light deflectors in general, and more particularly to light deflectors specifically adapted to digitally shift the focus of a beam selectively along a preselected path. While not limited to this use, the invention is particularly adapted for digitally shifting the focus of a light beam so that it can be directed onto a memory plane to record or read information on an element in the plane.

OBJECT

Thus, the primary object of this invention is to focus a light beam in an improved manner and in response to electrical signals.

SUMMARY OF THE INVENTION

A light deflector for controlling the focal point of a light beam comprising a first light transparent member for receiving the beam and having a plurality of external surfaces positioned to intercept said beam at angles exceeding the critical angle and reflect it back into said member by the principle of total internal reflection, with second members movably positioned to abut said first member at each reflecting surface such that, when in abutting relationship with the first member, the light will pass on into the second members and be reflected by a reflecting surface of the second members back into the first member, thereby to increase in length the path of said beam a predetermined distance and change the focus point of the beam relative to the first member.

The foregoing and other features and advantages of the invention will be apparent from the following more particular description of the preferred embodiments of the invention, as illustrated in the accompanying drawings.

DESCRIPTION OF THE PREFERRED EMBODIMENTS

The principle of total internal reflection is well known in optics wherein almost total reflection of a light beam occurs when the beam being transmitted within a material having a higher index of refraction is intercepted by an external surface which is adjacent to a material having a lower index of refraction. So long as the angle of incidence of the light rays approaching the surface exceeds the critical angle, total reflection at the surface will be achieved. For instance, with an ordinary right angle prism surrounded by air, light entering one of the two right angle faces is reflected almost totally when it reaches the surface of the hypotenuse face. It is also known that this principle applies provided there is a film of air or a vacuum adjacent to the hypotenuse surface which is approximately two wavelengths thick regardless of what material is located beyond the film. However, when a glass plate is brought into abutting relationship with the hypotenuse surface (thereby substituting the glass for the air as the adjacent medium), if the index of refraction of the plate and prism are nearly the same, the light approaching the hypotenuse surface from the internal side of the prism will pass on into the second glass plate. This principle is applied in the U.S. Pat. No. 2,997,922 entitled, "Light Valve," which issued Aug. 29, 1961, with Edward K. Kaprelian as inventor. In this patent, a light valve is constructed wherein light will either be reflected back into the prism by the internal reflection of the hypotenuse face or, with a glass plate being brought into contact with the face, will pass out through the second glass plate in a direction away from the prism.

Figure 1:
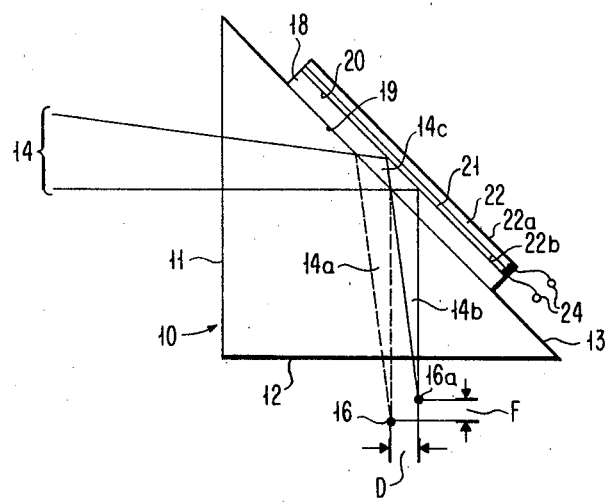
FIG. 1 shows a single stage light deflector.
Figure 2:
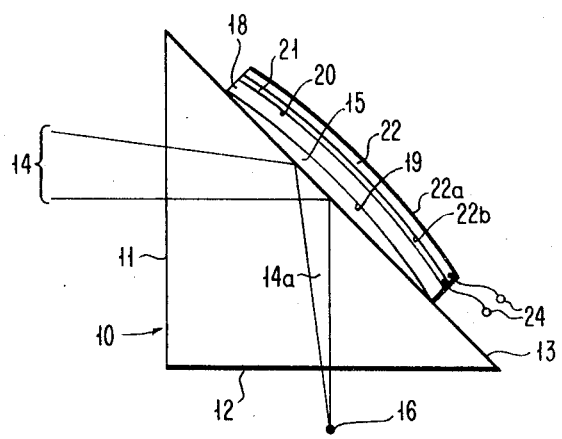
FIG. 2 shows the deflector of FIG. 1 activated to a second state.

In FIG. 1 is shown a light deflector employing the total internal reflection principle wherein a first light transparent member in the form of a right angle prism 10 having right angle surfaces 11 and 12 and a hypotenuse surface 13 is positioned to receive a light beam 14 through the face 11. As shown in FIG. 2 and described in the prior art, the light beam 14 will be reflected off the hypotenuse surface 13 if air or some other material having an index of refraction substantially lower than that of the prism is present in the space 15 external to the hypotenuse surface where the beam strikes. In the example to be described, the prism is surrounded by air or vacuum. However, it should be realized that other materials of different refractive indices could be used. Thus, in the absence of other circumstances, the beam will be reflected almost totally along a first path 14a (FIGS. 1 and 2) through the prism to result in the beam being focused at a focal point 16. The reflection of the beam is due to the principle of total internal reflection just described which occurs because the angle at which the light strikes the surface exceeds the critical angle.

Positioned external to the hypotenuse surface 13 of the prism is a second light transparent member in the form of a light reflecting plate 18 which contacts the hypotenuse surface at the point of intersection with the light beam 14. With the surface 19 of the glass plate 18 in contact with the hypotenuse surface of the prism, the index of refraction external to the hypotenuse surface is not substantially different than the index of refraction of the prism and the effect of the total internal reflection principle is negated. Thus, the beam passes external to the right angle prism along the path 14c shown in FIG. 1.

As described in the copending U.S. patent application referenced heretofore, a light reflector system is provided wherein the surface 20 of the glass plate 18 is made reflective so that, when the beam 14 reaches this surface, it is reflected back along the path 14b. As indicated in FIG. 1, this reflection of the beam makes it possible to digitally offset the path of the beam a distance D by the actuation of the plate 18. The reflecting surface 20 can be formed by coating the surface with a reflective coating 21, as shown in the drawings. In the alternative, the total internal reflection of light principle can be utilized by the proper alignment of the surface 21 relative to the beam at the point of intersection such that the beam is reflected along the path 14b when intersecting the surface.

In FIG. 1, it can be seen that the beam is reflected back along the path 14b, and, because of the similar indices of refraction of the plate 18 and right angle prism 10, the light will again pass through the prism and out the surface 12 (since the angle of incidence of the beam is less than the critical angle) to be focused at a point 16a external to the prism. Thus, the position of the beam is shown as being offset from the original path 14a by a distance D, which distance is a function of the length of the light beam path as the beam passes between the prism hypotenuse surface 13 and reflecting surface 20 of the glass plate 18. By varying the thickness of the glass plate 18, the distance D can be changed. From the foregoing, it is apparent that, by movement of that portion of the glass plate 18 adjacent the point of intersection between the light beam 14 and the hypotenuse surface 13 away from the hypotenuse surface by a distance approximating one wavelength or more, the beam will be reflected along the path 14a. Actuation of the glass plate 18 until it contacts the hypotenuse surface 13 at the point of intersection with the beam 14 will cause the beam to pass on into the glass plate and thereafter be reflected along the path 14b by the reflecting surface 20, as shown in the drawings.

The plate 18 is actuated from a position abutting the hypotenuse face of the right angle prism 10 to a position spaced therefrom in response to an electric signal serving to energize a piezoelectric element 22 fixed to the reflecting side of the plate 18. The reflecting side of the plate 18 is that side opposite the side which abuts the hypotenuse face 13 of the right angle prism. As is well known, the characteristic of such a piezoelectric element 22 is to expand when being exposed to a voltage potential between the faces 22a and 22b thereof to which the terminals 24 are attached. Because the element is fixed firmly to the reflecting surface of the plate, the resulting expansion of the element and the plate in a direction parallel to the reflecting surface of the plate 18 will bow the plate away from the surface 13 in the manner illustrated in exaggerated manner in FIG. 2. This bowing action will cause the center section of the plate to move away from that portion of the hypotenuse surface which intercepts the beam 14. It has been found that the application of just a few hundred volt potential across the terminals 24 will cause a movement of the center portion of the plate 18 as much as several microns away from the hypotenuse surface, with the actual distance of movement depending upon the overall size of the plate and element.

The actuating time for the plate is only a few microseconds since the piezoelectric element reacts quickly. Thus, the switching of the beam is substantially instantaneous. With the movement of the plate 18 between the position indicated in FIG. 1 and the position indicated in FIG. 2, the beam reflection path will shift from that shown as 14b to that shown as 14a. In this manner, the position of the beam is digitally offset in quick response to the receipt of an electrical voltage signal at the terminals 24. Additionally, evacuation of the air permits the surfaces to come together quickly since air damps the plate motion. Contact is further aided by the molecular attraction of the glass material. To speed movement of the plate into contact with the prisms further, a reverse voltage can be applied between the element faces 22a and 22b for causing the element to contract more quickly to drive the plate back to the "unbowed" condition shown in FIG. 1.

In accordance with the invention, there is provided a light focus shifting system comprising a light transparent medium having a plurality of surfaces positioned to intersect and deflect the beam in consecutive order, with second light transparent members positioned to abut the medium surface at each point of intersection with the beam, which second members function in the manner heretofore described to control the beam deflection and thus change the beam path length through the system. With the second members actuated to negate any offsetting of the beam path as the beam leaves the system, the focus point of the beam is altered with actuation of the second members without deflecting the beam thus a digital focus shifting of the beam is achieved substantially instantaneously in response to an electrical input signal.

Figure 3:
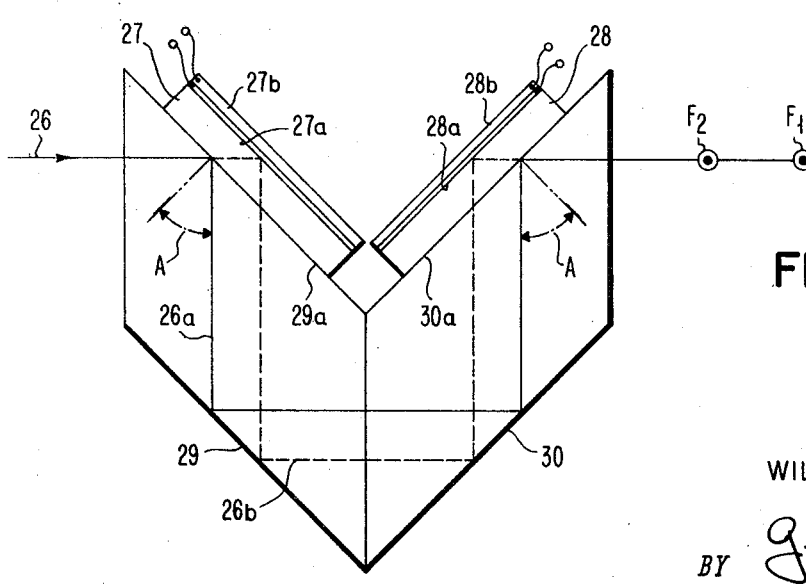
FIG. 3 shows a beam focusing mechanism embodying the subject invention which acts in response to an electric input signal.

Accordingly, as shown in FIG. 3, the focus point of the beam 26 can be shifted between the points $f1$ and $f2$ by combining such means for changing the path length of the beam through a light transmitting medium. This is achieved in the example shown by actuation of the reflecting plates 27 and 28 positioned adjacent the prisms 29 and 30, respectively. In the example shown, the focus point for the beam is changed by altering the path length within the transparent transmitting mediums, i.e., the prisms 29 and 30, in a manner such that the beam preferably is transmitted away from the last reflecting surface of the prism along the same path to exit the prism 30 at the same place. The beam 26 in passing through the prisms 29 and 30 will encounter the surfaces 29a and 30a in succession. Since the angle A exceeds the critical angle, the light normally will be reflected from the surfaces and pass along the path indicated by the solid line 26a. However, as described previously, with the plates 27 and 28 actuated to a position abutting the surfaces 29a and 30a respectively, the beam will be transmitted into the plates. The reflecting plates 27 and 28 each include respectively a reflecting surface 27a and 28a along with a piezoelectric element 27b and 28b attached and functioning in the same manner as described in the previous embodiment to actuate the plates and thus control the reflection of the beam. By applying a voltage potential across the elements, the plates can be caused to bow away from the prisms 29 and 30 at the point of impingement of the beam, respectively, to alter concurrently the path of the beam. The reflecting plates can be actuated in groups of any number of plates to change the beam path length and maintain the beam positioned along the same exit path.

For example, with both the plates 27 and 28 positioned away from the adjacent prism surfaces, the beam will follow the solid line path 26a through the prisms 29 and 30 and be focused at the focal point $f1$. However, with the plates 27 and 28 in contact with the adjacent prism surfaces, the beam will enter the plates and pass along the dotted line 26b to be focused at the focal point $f2$. In either instance, the beam is controlled to exit the prism along the same path yet be focused at a different point along the path. Naturally, more focusing points can be obtained by the addition of other prisms and reflecting plates. In this manner, focusing of the beam is achieved responsive to the electrical signal supplied to the piezoelectric elements on the reflecting plates.

While the invention has been particularly shown and described with reference to preferred embodiments thereof, it will be understood by those skilled in the art that various changes in the form and details may be made therein without departing from the spirit and scope of the invention.

What is claimed is:

1. A light focus shifting system for use with a light focusing system comprising the combination of:
   a first light transparent medium for transmitting a focused light beam and second light transparent means with reflecting surfaces for altering the physical path length through the first medium thereby to shift the focus of the beam to different points relative to the light focusing system,
   said second light transparent means positioned to intersect the beam, and means for switching the beam path to different areas on alternate surfaces for changing the path length in the medium.

2. A light focus shifting system comprising the combination as defined in claim 1 wherein said light transparent medium includes a plurality of surfaces positioned to intersect said beam in sequence and at an angle exceeding the critical angle, thereby to reflect the beam by the principle of total internal reflection,
- a light transparent member positioned for movement between a first position spaced from each said point of interception between the beam and medium surface and a second position abutting said medium surface thereby to cause the beam to enter said member,
- a reflecting surface adjacent said second member for reflecting the beam entering said member back toward said medium, and
- means to control the positioning of said second member thereby to alter the path length of said beam in the medium for focusing the beam at various points spaced relative to said medium.

3. A light focus shifting system comprising the combination as defined in claim 2 wherein said light beam after being transmitted by said medium exits said medium and said light transparent members always are actuated such that the axis of the beam exiting the medium remains unmoved.

References Cited

UNITED STATES PATENTS 2,997,922   8/1961   Kaprelian _____ 350—28

OTHER REFERENCES

"Total Internal Reflection Light Deflector," by Habegger et al., Applied Optics, vol. 5, No. 9, September 1966

DONALD L. WIBERT, Primary Examiner

P. K. GODWIN, JR., Assistant Examiner

U.S. Cl. X.R.

350—285, 286, 288, 299